United States Patent [19]

Trian

[11] Patent Number: 5,034,643
[45] Date of Patent: Jul. 23, 1991

[54] MAGNETIC CIRCUIT FOR THE STATOR OF AN ELECTRIC MOTOR AND STATOR EQUIPPED THEREWITH

[75] Inventor: Herve Trian, Parne Sur Roc, France

[73] Assignee: Societe Anonyme A Directoire Called Pompes Salmson, Rueil Malmaison, France

[21] Appl. No.: 538,781

[22] Filed: Jun. 15, 1990

[30] Foreign Application Priority Data

Jun. 16, 1989 [FR] France ............... 89 08012

[51] Int. Cl.$^5$ .................... H02K 3/34; H02K 5/22
[52] U.S. Cl. .......................... 310/215; 310/89
[58] Field of Search ............ 310/45, 89, 179, 215

[56] References Cited

U.S. PATENT DOCUMENTS

| 2,169,097 | 8/1939 | Hall et al. |
| 2,173,726 | 9/1939 | Prindle |
| 2,252,440 | 8/1941 | Safford |
| 2,400,576 | 5/1946 | Sigmund et al. |
| 2,701,317 | 2/1955 | Herman |
| 2,761,985 | 9/1956 | Schaefer |
| 2,935,859 | 5/1960 | Marvin Jr. |
| 3,209,992 | 10/1965 | Christiansen |
| 3,505,729 | 4/1970 | Balke et al. |
| 4,862,024 | 8/1989 | Stingle et al. |

FOREIGN PATENT DOCUMENTS

| 138550 | 8/1934 | Austria | 310/215 |
| 569581 | 8/1958 | Belgium | 310/45 |
| 2239004 | 2/1974 | Fed. Rep. of Germany | 310/215 |
| 0159605 | 12/1979 | Japan | 310/215 |

*Primary Examiner*—Steven L. Stephan
*Assistant Examiner*—Dennis R. Haszko
*Attorney, Agent, or Firm*—Richard C. Litman

[57] ABSTRACT

The invention concerns the stator of an electric motor comprising a packet a stacked laminations provided with laterally open slots for receiving the active portions of the windings for the motor poles in which the surface of each slot carries an inner layer of a molded insulating material applied to the insulation surface of the slot, the layer in each slot being united with the layer of each one of the adjoining slots at the two outer sides of the stator by means of an insulating lateral layer so that the combiantion of the layers forms a one-piece molded layer over the slot region, thus providing good insulation of the magnetic circuit in electric motors designed to have a long service life at elevated temperatures such as those used for central heating circulation pumps.

5 Claims, 1 Drawing Sheet

MAGNETIC CIRCUIT FOR THE STATOR OF AN ELECTRIC MOTOR AND STATOR EQUIPPED THEREWITH

BACKGROUND OF THE INVENTION

The present invention relates to a magnetic circuit for the stator of an electric induction motor comprising a packet of stacked laminations provided with laterally open slots adapted to receive the substantially rectilinear active portions of the turns of the winding for the poles of the motor, the surface of each slot being covered by an internal layer of an electrically insulating material molded onto the inner insulation surface of the slot whereat it forms a laterally open insulating channel for insulating said active portion of the turns housed in the slot from the body of the motor, and the layer in each slot being united with the layer of each one of the two adjoining slots at the two outer sides of the stator by an electrically insulating lateral layer, the combination of the internal layers and the lateral layers constituting a one-piece molded layer over the slot region, ensuring insulation of the slot region from the body of the motor and at least cohesion of the packet of laminations.

The stators of low and medium power electric motors carry slots into which the wires constituting the pole windings of the motor are introduced through a relatively thin slit provided between two teeth of the magnetic circuit. There is generally only a small difference in voltage between two adjoining wires of a winding, this difference being generally less than one volt in the case of fractional horse-power electric motors operating from a supply with 200/380 volts between phases, and a simple varnish insulation is sufficient to ensure the turns are insulated from each other. Insulation with respect to the conducting body of the motor at the base area of the slot must, on the other hand, not only be able to withstand the nominal supply voltage, but also be able to withstand surges and spikes resulting from switching and the like or atmospheric phenomena which can be present in the supply, and for this reason the base of the slot must be covered by a sheet of insulator, the fitting of which can often be a costly time-consuming operation.

The question of replacing the base insulator of the slot by an economical process that insulates the slot has been raised but, up until now, was not able to be resolved in a reliable manner from the electrical point of view in the case of motors such as those used for hot water circulations pumps, notably water for heating purposes, which must have a very long service life without suffering from breakdown, while being able to be supplied from any sort of three-phase or single-phase network which under exceptional conditions can receive powerful fast-rising voltage spikes of atmospheric origin, which can, for example, attain figures of ten times the single-phase network voltage (in other words 2,200 volts for the 220 volt single-phase network).

The present invention notably has the aim of resolving the problem of providing insulation for the slots at a competitive price while making the best use of the laminations of a magnetic circuit of a motor.

SUMMARY OF THE INVENTION

With this aim in view, according to the invention the molded one-piece layer includes, on each outer side of the stator, a sleeve portion projecting outwardly in the axial direction in the form of an elongated cylindrical sleeve concentric with the air-gap and adapted to provide covering and protection of the overhang or free ends of the windings housed in the slots. The one-piece molded layer has a distinctly smaller thickness in the region of the inside surface of the slots and, if appropriate, the air-gap, than in the region of the outer sides of the stator where it acts as an optionally ribbed rigid radial support for said elongated sleeve. The insulating material of the integral layer is in general made up by a moldable material such as a polyester resin designed for ensuring insulation of the magnetic circuit with respect to the body of the motor at elevated temperatures.

The one-piece insulating layer covers, at each end of the stator, at least a part of the lateral surface of the slotted magnetic circuit that faces the air-gap. The molded-on one-piece layer can be integral with an outer casing which at least partially surrounds the magnetic circuit yoke over which it is molded and which carries the lower portion of an electrical terminal box.

When the one-piece molded layer covers, at each end of the stator, the whole of the slot magnetic section and the air-gap region of the stator so as to completely encapsulate the slot region and the air-gap region of the stator magnetic circuit and the magnetic circuit according to the invention is applied to a motor the rotor of which is separated by an air-gap tube, the air-gap tube that sealingly separates the rotor of the motor with respect to the outside thereof is placed directly against an air-gap insulating layer that constitutes a part of said one-piece molded layer and which physically and electrically insulates said tube from contact with the laminations of the magnetic circuit. The winding free ends or overhang can be housed below the outer sleeve provided at each end of the stator and are rigidly united with this sleeve by a mechanically resistant embedding means, obtained for example by heat-curing or polymerizing an adhesive coating material, in order to form at each side of the stator, an electrically insulating rigid annular block containing the winding free ends or overhang and which is externally reinforced by said sleeve.

BRIEF DESCRIPTION OF THE DRAWINGS

Other aims, advantages and features of the invention will become more clear from reading the description of various embodiments of the invention, which should however not be considered as limiting, in conjunction with the attached drawing in which.

DESCRIPTION OF PREFERRED EMBODIMENTS

Figure 1:
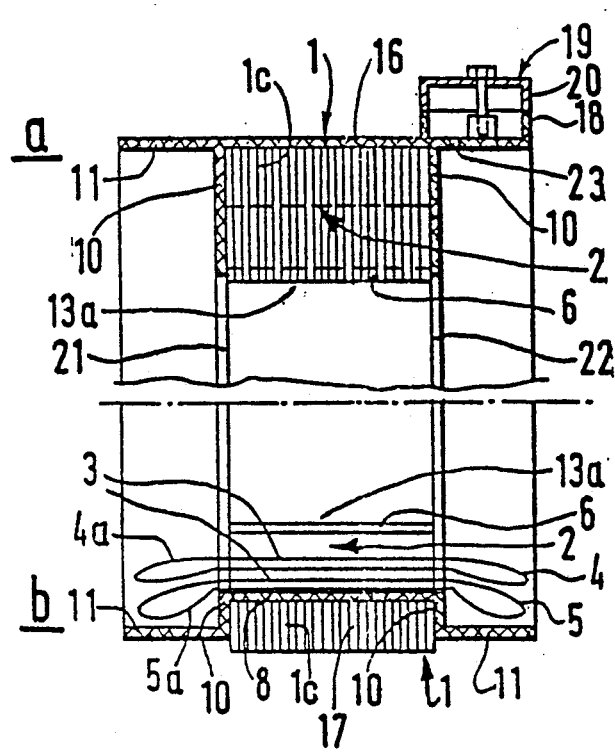
FIG. 1 is a cross-sectional view along a diameter (the half-planes 1a—1a, 1b—1b along which the section is taken are illustrated in FIG. 2) of a magnetic circuit for an electric motor stator in accordance with the invention, this figure illustrating two embodiments of the stator with integral slot insulation (embodiment a being at the top and embodiment b at the bottom)

With reference now to FIG. 1, the stator magnetic circuit 1 of an induction electric motor (in other words an alternating current motor the normal speed of which is close to the speed of synchronization with the supply frequency), is made up by a stack of thin laminations 1c of magnetic grade (with low hysteresis loss), for example 0.4 mm thick. These laminations are not generally covered by an insulator but a thin layer of air does get trapped between adjacent laminations when the stack is formed and this is sufficient to provide a certain degree of electrical insulation for stopping eddy currents, thus substantially limiting power losses to losses due to the alternating magnetization of the circuit. The stacked laminations form slots 2 which can be best seen in FIGS. 2 and 3 and which are designed to receive the substantially rectilinear active parts 3 (see the schematically represented windings 4 and 5 at the bottom half of FIG. 1) of the windings which are introduced through the slit 6 of a slot. The iron portions remaining between the slots 2 constitute the slot magnetic circuit 24 which generally possesses a constant width and a widened base 25 terminating at the air-gap in order to reduce the maximum induction prevailing in the air-gap.

In order to provide the insulation of the slots in accordance with one embodiment of the invention, the packet of stacked laminations 1 is held tightly clamped in the axial direction, for example using radially distributed jaws acting on the region 7 of the base of the teeth (see FIG. 2) and a layer of insulation 8 in an electrically insulating material is injected by an in situ molding technique onto the base of the slots and right up to the area adjoining the root of the teeth (see the border line 9 which substantially corresponds to the limit of the radially-distributed jaws).

Regarding the choice of an insulating material that is easy to inject, in certain applications that are only subject to limited heating, polyethylene can be used, but for higher-performance electric motors (class F), such as motors used to drive central heating circulation pumps, it is preferable to use a moldable material able to withstand elevated temperatures of the order of 200° C. prevailing at the surface of the iron or of the copper constituting the windings, this being molded to provide a thickness of about 0.5 mm thus enabling it to withstand excess voltages of the order of 2,000 volts. The layer that is injected into a slot forms an insulating tube thereupon which opens laterally to the outside by means of the slit 6 forming the slot opening, and provides perfect insulation for the bundle(s) of wires used in the windings received in the slot with respect to the metallic body of the motor.

The set of insulating tubes which is retained axially solely by contact friction at the slot base is jointed together at each side 21 or 22 of the stator 1 by an insulating lateral layer that forms an insulating ring 10 bridging two adjoining slots so as to establish a network of parallel braces that maintains the assembly of laminations 1c in axial compression. The one-piece layer 8 molded over the slot region has proved to occupy very little space when compared to slot insulations added later, and fulfills not only an insulating function but provides a function of maintaining the homogeneity of the laminations packet of the magnetic circuit and improving the vibration performance thereof.

In accordance with one particularly advantageous embodiment of the one-piece molded layer, the latter includes, at each end 21, 22 of the stator, a sleeve portion 11 that projects outwardly in the axial direction and takes the form of an elongated cylinder part that is concentric with the air-gap. The sleeve portion 11 generally has a thickness that is appreciably greater than the thickness of the insulation layer inside the slots, for example of the order of 1 mm instead of 0.5 mm for the layer thickness inside the slots. As can be seen at the bottom part of FIG. 1, the sleeve 11 has the purpose of protecting the winding overhang or free ends 4a and 5a. It can also be used to hold them in place to prevent them becoming deformed due to the effect of peak currents, the winding overhang being made to adhere to the sleeve 11 by means of a bonding coating and a polymerizable varnish.

Figure 4:
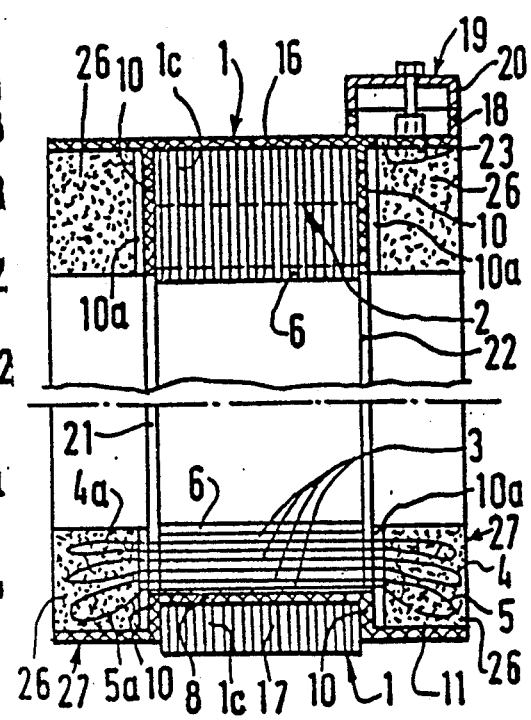
FIG. 4 is a similar view to that of FIG. 1, showing the stator of an induction electric motor after carrying out the operation of embedding the winding overhang in two rigid annular blocks.
Figure 2:
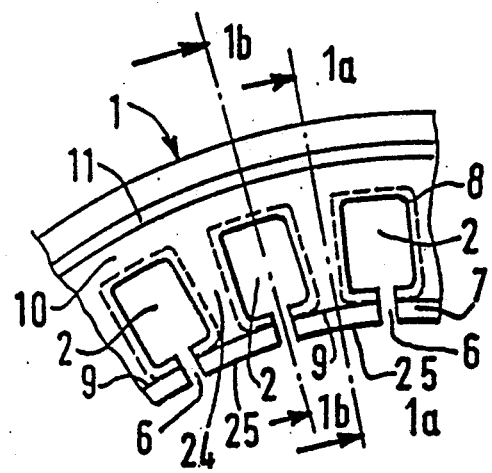
FIG. 2 shows a fragmentary view on an enlarged scale and viewed from the end of three slots of the electric motor shown in sectional view at the bottom of FIG. 1.

In accordance with the embodiment of the electric motor stator shown in FIG. 4, it can be seen how the lateral insulating rings 10 which generally are appreciably thicker than the insulating layer inside the slots (for example 2 to 3 mm instead of 0.5 mm) are further reinforced and rendered rigid by means of radial ribs 10a, in order to provide a rigid radial support for the elongated sleeve 11 which covers and protects the winding overhang 4, 5. In the embodiment shown in FIG. 4, the winding overhang 4, 5; 4a, 5a illustrated schematically in the bottom half of the figure only corresponding to the sectional plane 1b of FIG. 2, is embedded in a bonding substance 26 frequently referred to as compound filling, which simultaneously constitutes a highly adhesive and mechanically strong electrical insulation after drying or polymerization thereof, and which furthermore has, where possible, fairly good thermal conductivity, thus favoring cooling of the winding overhang. This compound 26 constitutes, together with the winding overhang which itself forms a sort of metallic reinforcement, and the sleeve 11, a rigid and electrically insulating annular block 27. This annular block 27, located at both sides of the stator, contains the winding overhang thus protecting it from all types of aggression, be it mechanical, chemical, electrical or otherwise, and is externally reinforced by the sleeve 11 to which it is firmly bonded, this latter being supported in the radial direction by the lateral insulating rings 10. The two rings 10 are held in place and mutually spaced by the air-gap insulation layers forming tubes with a laterally open section, and by the outer casing 16 that surrounds the yoke 17 of the magnetic circuit of the motor.

Figure 3:
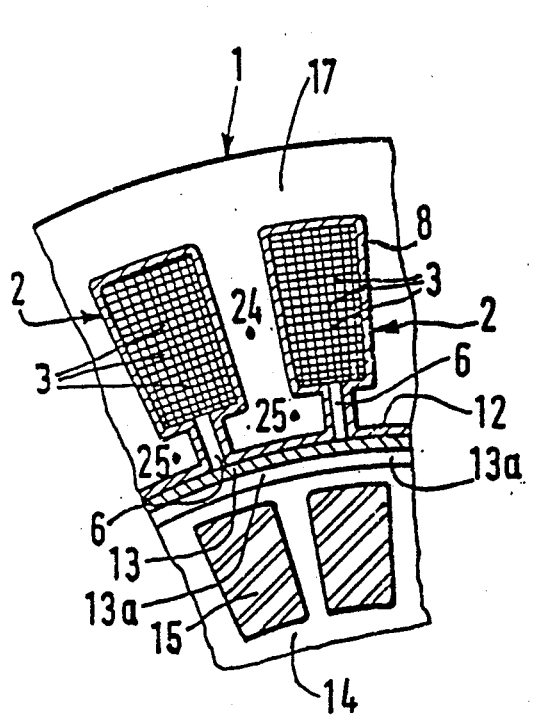
FIG. 3 is a cross-sectional view, also on an enlarged scale, of a part of the stator and a part of the rotor of an electric motor having an air-gap tube and incorporating a magnetic circuit in accordance with the invention.

In accordance with an embodiment illustrated in FIG. 3, the one-piece molded layer covers the totality of the region around the slots 2 of the air-gap, notably constituting an air-gap layer 12 so as to hermetically encapsulate or seal, where appropriate, the whole of the magnetic circuit and to thus protect it, for instance, from corrosion. When the electric motor includes a thin air-gap tube 13 in a non-magnetic material such as stainless steel, it is thus possible to provide for this air-gap tube 13 to come in direct contact with the air-gap layer 12 providing physical (notably thermal) and electrical insulation thereof from the magnetic circuit which is a relatively good conductor of heat and electricity. The rotor 14 of the electric motor carrying the bars 15 of the squirrel-cage rotor circuit is kept distinctly separated by the actual air-gap itself 13a from the air-gap tube 13 in order to avoid any contact during rotation with the air-gap tube, the latter being relatively fragile because of its reduced thickness.

In accordance with an alternative embodiment shown in cross section in the upper half of FIGS. 1 and 4, the molded one-piece layer 8 surrounds not only the slots region 2 but also forms an outer casing 16 at least partially surrounding the yoke 17 (see FIG. 3), of the magnetic circuit. The outer casing 16 molded over the yoke 17 carries as an integral molding therewith the lower portion 18 of a terminal box 19 which is closed off by a cover 20. The electrical connections to the windings 4 and 5 of the electric motor can be provided through the sleeve 11 (see passage 23 in FIG. 1) the latter thus acting as an insulator and a support for the phase leads in their passage to the windings via the sleeve 11.

As has already been stated in connection with the sleeve 11 and the electrical windings, the one-piece molded insulating layer 8, 10, 11 can be included as part of a general compound molding of the windings and of the stator magnetic circuit thus forming, after the windings have been fitted, an assembly that is rigid and well insulated electrically in which the leads exhibit no likelihood of shifting their position both with respect to each other and to the magnetic circuit.

Obviously, the present invention is not limited to the embodiments that have just been described and illustrated but may undergo numerous variations available to those skilled in the art without departing from the spirit of the invention.

What we claim is:

1. In a magnetic circuit for the stator or an electric induction motor having a body, a rotor within said stator forming an air-gap intermediate said stator and rotor, the improvement comprising; two outer sides on said stator, said stator including a packet of stacked laminations provided with laterally open slots, substantially rectilinear active portions of winding turns disposed within said slots and having free ends overhanging from said slots, each said slot having a surface covered by a molded internal layer of an electrically insulating material to form a laterally open insulating channel for insulating said active portions of said winding turns disposed within said slots, an electrically insulating lateral layer uniting said internal layer of each said slot with said internal layer of two adjoining ones of said slots adjacent said stator two outer sides, said internal and lateral layers providing a one-piece molded layer over said slots to ensure insulation of said slots from said motor body and at least cohesion of said packet of laminations, said one-piece molded layer including, on each said outer side of said stator, a sleeve portion projecting outwardly in an axial direction and defining an elongated cylindrical sleeve concentric with said air-gap and adapted to provide covering and protection of said free ends of said winding turns disposed in said slots said stator including a yoke, a molded outer casing integral with said one-piece molded layer and, an electrical terminal box attached to said outer casing.

2. A magnetic circuit according to claim 1 wherein, said one-piece molded layer defines a distinctly smaller thickness in the region of said slot surface than in the region of said stator outer sides.

3. A magnetic circuit according to claim 2 wherein said one-piece molded layer includes ribbed support means juxtaposed said stator outer sides.

4. A magnetic circuit according to claim 1 including, an air-gap tube intermediate said rotor and stator and overlying said one-piece molded layer, and said one-piece molded layer overlying said stator outer sides whereby, said slots are completely encapsulated.

5. A magnetic circuit according to claim 1 wherein, said winding turn free ends are disposed within the confines of said outwardly projecting sleeve portion, and embedding means rigidly uniting said free ends relative said sleeve portion.

* * * * *